Jan. 9, 1968         C. R. FOREMAN         3,362,439
MACHINE FOR THE PRODUCTION OF SPRING ASSEMBLIES
Filed Sept. 29, 1965                     12 Sheets-Sheet 1

Jan. 9, 1968 C. R. FOREMAN 3,362,439
MACHINE FOR THE PRODUCTION OF SPRING ASSEMBLIES
Filed Sept. 29, 1965 12 Sheets-Sheet 8

FIG. 9

INVENTOR
CHRISTOPHER R. FOREMAN

ATTORNEY

FIG. 13D

# United States Patent Office 3,362,439
Patented Jan. 9, 1968

3,362,439
MACHINE FOR THE PRODUCTION OF
SPRING ASSEMBLIES
Christopher R. Foreman, Kingsbury, London, England, assignor to Pullman (Patent) Products Limited
Filed Sept. 29, 1965, Ser. No. 505,301
Claims priority, application Great Britain, Oct. 2, 1964, 40,356/64
23 Claims. (Cl. 140—3)

ABSTRACT OF THE DISCLOSURE

Spring assemblies for mattresses or the like are produced by feeding to a machine rows of hour-glass springs and associated crimp wires having crimp portions shaped in elevation as a U having a lip extending from the end of the free limb. In the machine, overlapping end coils of successive rows of springs are interconnected by turning the crimp wires though a part-revolution, and are then urged to slide apart. The lips of the crimp portions are then bent over to secure the end coils together and so lock the springs in position.

---

This invention relates to a machine for the production of spring assemblies for mattresses or the like.

The springs of such assemblies are usually of the hour-glass type and may be arranged in parallel rows with the top and/or bottom end coils of the springs interconnected by means of wires which extend parallel to the rows. The rows overlap by a short distance and the spacing of the springs in the rows may be determined by the spacing along the wires of crimped parts which engage the end coils of the springs where they overlap; British Patent No. 920,741 discloses a machine for producing such assemblies. This prior machine is arranged to receive a series of successive trays each holding a row of springs and two crimp wires which extend along the spring row. The crimp wire comprises a generally straight wire formed at the spring positions with crimp portions each of which is S-shaped in side elevation. In the prior machine the trays were manually loaded with springs and fed into the machine by means of an endless conveyor. The crimp wires were interlaced into overlapping end coils of the springs by angling the end coils and oscillating the crimp wires. The interlaced S-shaped portions were then clinched to hold the overlapping lengths of the end coils in position.

It is an object of the invention to provide a machine for the production of spring assemblies in which the interconnecting of the end coils of the springs by the crimp wires is simplified. It is a further object to provide improved means for feeding the springs to the spring-receiving part of the machines; said means may be employed with a variety of assembly machines.

According to the present invention there is provided a machine for producing assemblies of helical furniture springs arranged in parallel rows and having their end coils interconnected by crimp wires which extend parallel to the rows; the machine being arranged to receive successive rows of springs and at least one crimp wire which extends along the spring row and comprises a generally straight wire formed at the spring positions with crimp portions each of which comprises a lop shaped in elevation as a U having a lip extending from the end of the free limb; and the machine comprising receiving means arranged to receive successive rows of springs and crimp wires with the leading lengths of the end coils of the entering row of springs overlapping the trailing lengths of the end coils of the springs of the preceding row and with the crimp wires aligned with said trailing lengths; means for rotating the crimp wires through a part revolution whereby said lips pass through between the overlapping lengths of adjacent springs which are then located by each trailing length being sandwiched between the yoke of the U and the leading length which is itself sandwiched between the trailing length and straight lengths of the crimp wire; means for effecting movement of the entering row of springs rearwardly relative to said preceding row of springs to bring the leading ends of the end coils of the entering springs into contact with said crimp portions; and clinching means for bending the lips round said leading lengths to lock the springs in position.

Preferably, each of the rows of springs and crimp wires is fed into the machine in a tray provided with spring-loaded turners for rotating the crimp wire, said turner being cocked when the springs and crimp wire are loaded into the trays.

In a preferred form the spring-feeding tray comprises a pair of walls between which a row of helical furniture springs is arranged to be accommodated, means for locating the springs in predetermined positions along said row, said walls being arranged to move away from each other to facilitate insertion of the springs and to move towards each other to effect gripping of the end coils of inserted springs and so hold the inserted springs in position.

Further according to the present invention there is provided a transfer loader for a spring-feeding tray as defined above, said transfer loader being arranged to accommodate at least part of a row of springs and comprising gripping means aranged to hold the springs by releasably engaging the mid-portions thereof, abutments arranged to engage the ends of the springs, and guide faces leading to said abutments and arranged to facilitate manual insertion of the springs into the loader.

Preferably, means are provided in the tray and the loader for holding at least one crimp wire which extends along the spring row.

The transfer loader is intended to be manually filled with springs and wires, but it is possible that such filling could be effected automatically or semi-automatically.

The invention furthermore provides a method of producing spring assemblies as herein described.

An embodiment of the invention will now be described, by way of example, with reference to the accompanying drawings in which.

Figure 1:
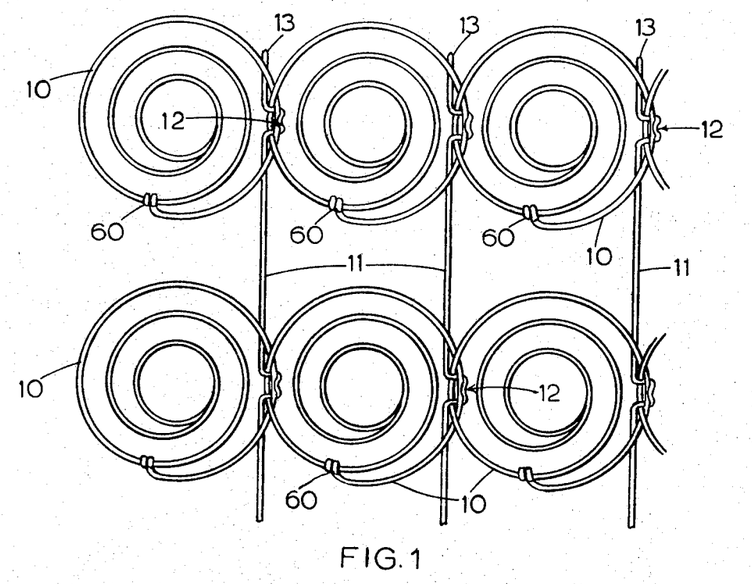
FIG. 1 is a plan view showing a fragment of a completed spring assembly for a mattress.

Referring to FIG. 1 of the drawings, the spring assembly comprises rows of furniture springs 10 of hour-glass shape. Crimp wires 11 extend parallel to the rows and the end coils of the springs, which overlap by a short distance, are interconnected by crimp portions 12 of the wires 11. In this assembly both the top and bottom end coils of the springs are held by crimp wires. As shown, the end portions of the crimp wires are cropped as at 13 between the end springs of adjacent rows. Edge binding wires (not shown) may be provided, if required, and end binding wires (not shown) may also be provided, if required.

Figure 2:
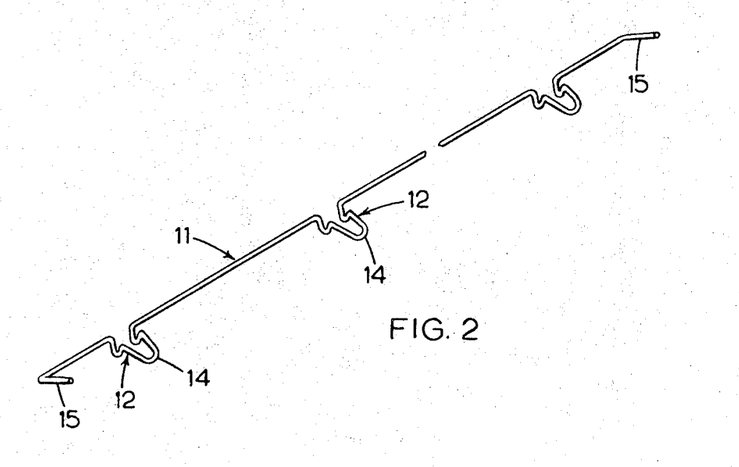
FIG. 2 is a detail view showing a crimp wire.

FIG. 2 illustrates a crimp wire prior to the crimping operation, and it will be noted that the crimp portions 12 are each shaped in end elevation as a U having a lip 14 extending downwardly, at about 20° to the horizontal, from the end of the free limb of the U. Ends 15 of the crimp wires are pre-bent at right angles to the wire length for a purpose hereinafter described.

Figure 3:
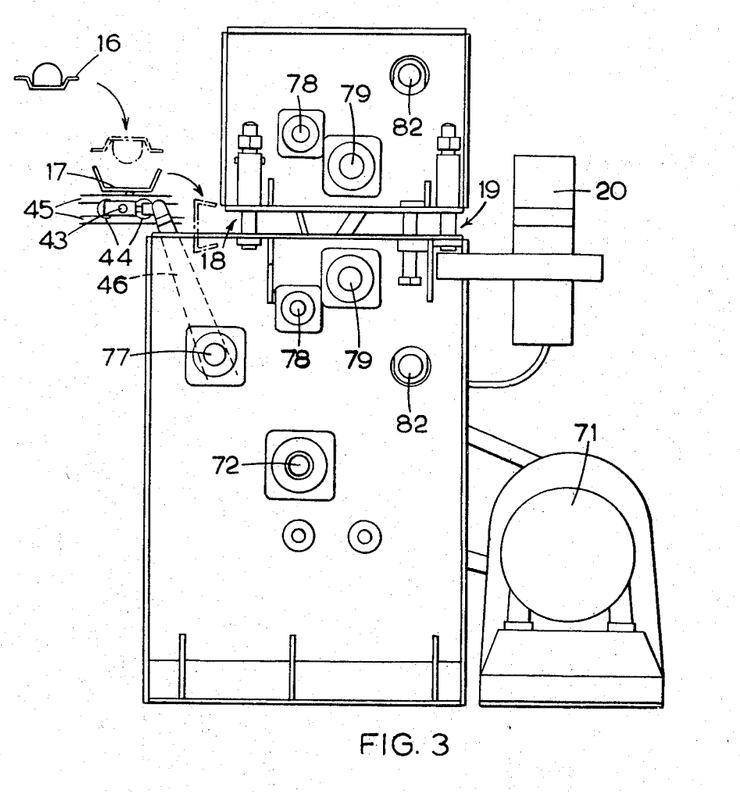
FIG. 3 is a side elevation showing a machine for producing spring assemblies.
Figure 4:
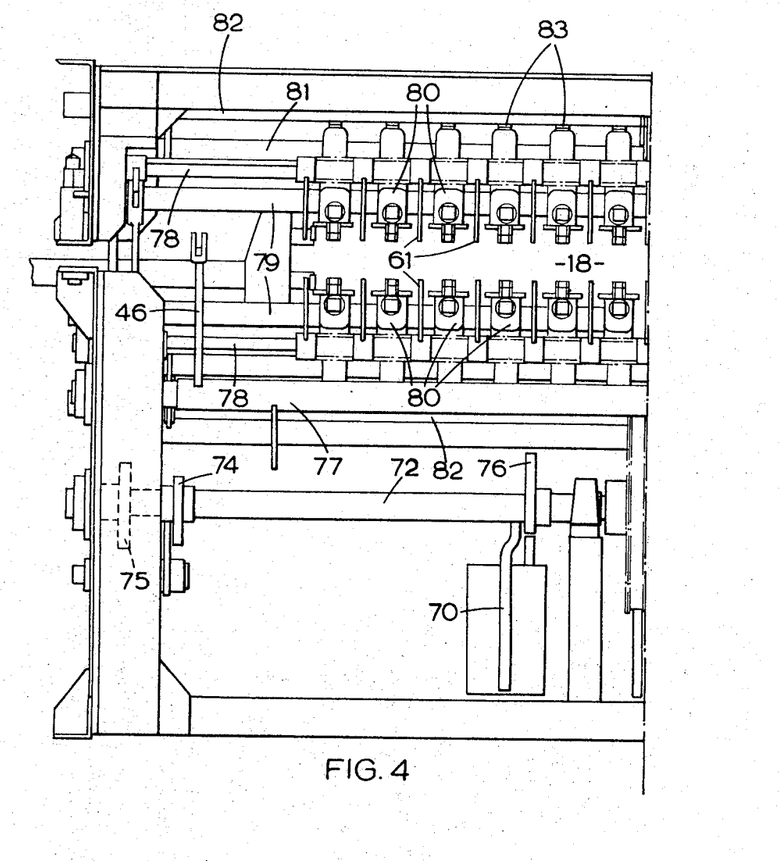
FIG. 4 is a front elevation showing the feed-in side of the machine.
Figure 5:
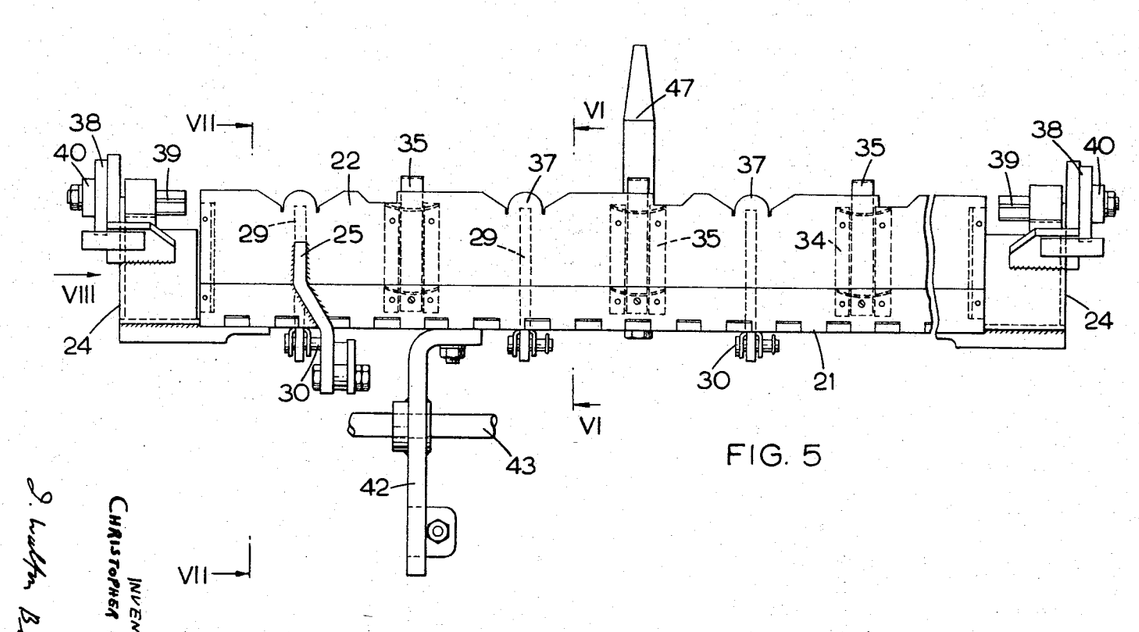
FIG. 5 is a detail side view showing a spring-feeding tray.
Figure 6:
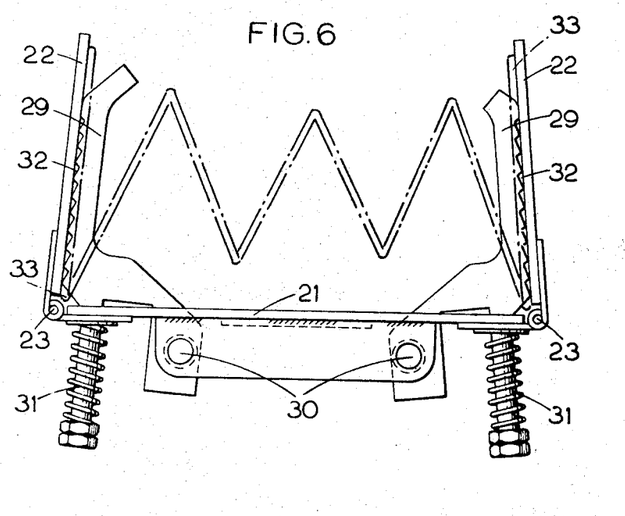
FIG. 6 is a section on the line VI—VI of FIG. 5.
Figure 7:
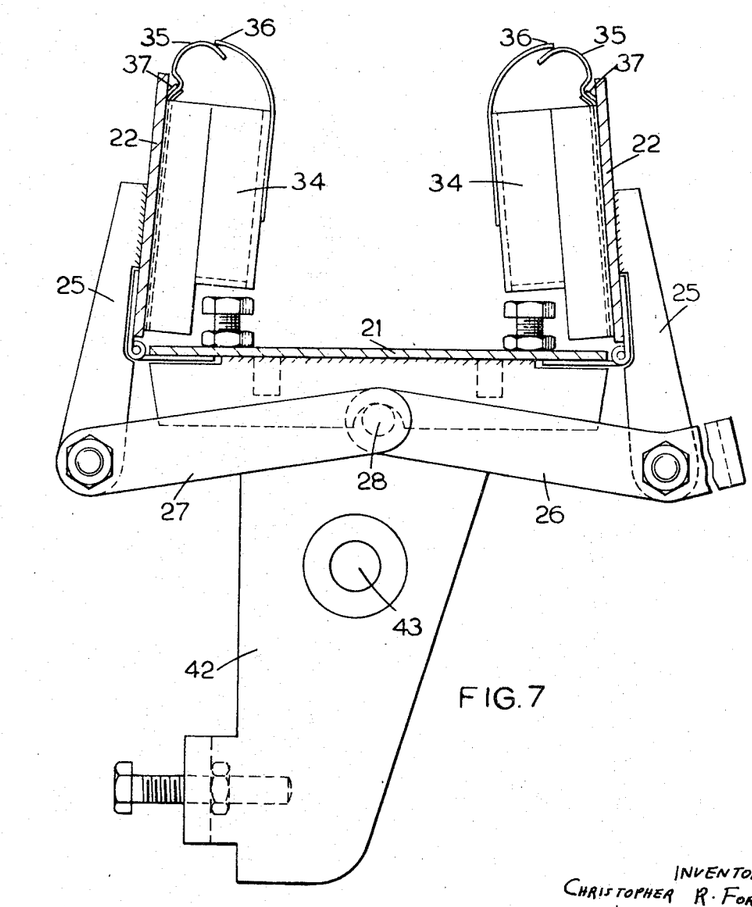
FIG. 7 is a section on the line VII—VII of FIG. 5.
Figure 8:
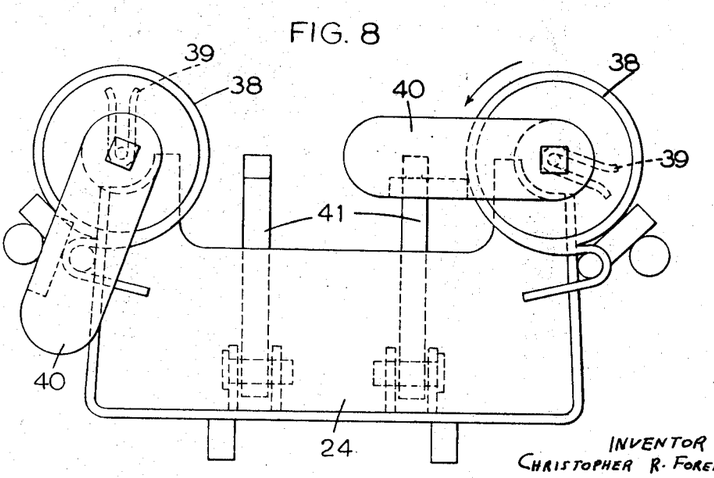
FIG. 8 is a view in the direction of arrow VIII of FIG. 5.

The steps in the formation of the spring assembly will now be described, generally, with reference to FIG. 3.

Initially, springs 10 and crimp wires 11 from a convenient supply are inserted manually into a transfer loader 16. The loader is then moved to a position above a spring feeding tray 17 when the tray is in an upwardly open position and the springs and crimp wires are transferred into the tray. The tray is then turned through 90 degrees and is moved forwards into the spring-receiving part 18 of the machine where the springs are engaged with their end coils overlapping the end coils of the preceding row of springs. The crimp wires are then turned to interlace with the overlapping end coils of the springs and the trays are then withdrawn. The assembly is then moved a step forward and the portions 12 of the wires are then clinched. The spring assembly emerges in a series of steps from the rear outlet 19 of the machine where a cropping mechanism 20 severs the ends 15 of the crimp wires.

The assembly machine will now be described in greater detail, with reference firstly to FIGS. 5 to 8 which show the spring feeding tray.

The tray comprises a flat base 21, a pair of side walls 22 hingedly attached at 23 to the longer edges of the base, and a pair of end walls 24 extending upwardly from the shorter edges of the base. The walls 22 are secured to arms 25 and hinging movement of walls 22 is effected by means of levers 26 and 27 which are pivotally connected at 28.

A number of pairs of L-shaped and reversed L-shaped levers 29 are provided in the tray at the spring positions, the levers being pivotally mounted under the tray at 30. The levers are loaded by springs 31 so that the outer faces 32 of their upright arms are urged towards the hinged sides of the tray; these faces are serrated to promote gripping of spring end coils 33. A series of semi-cylinders 34 project inwardly from the tray walls 22 to provide locating means for springs being inserted and to carry spring clips 35 to hold crimp wires 11; clip shields 36 are also provided to prevent the crimp wires passing to the inner sides of the clips 35. A series of inwardly angled lips 37 is formed along the top of each side wall of the tray for positioning the crimp wires.

Above each of the end walls 24 of the tray two spring-loaded turners 38 are provided to engage the pre-bent ends 15 of the crimp wires 11. The turners have wire-engaging mouths 39 and are provided with external levers 40 by which they are preset or cocked; as shown, only the right hand turner (FIG. 8) is in the cocked position where it is held by a pivotal catch 41.

Means (not shown) such as a series of pairs of shaped shallow walls having opposed hooked portions may be provided along the base of the tray, at the position of the L-shaped arms, to hold the first row of springs as hereinafter described.

The tray is held, in its upwardly-open position, on a pair of brackets 42 which are secured to the base 21 and are mounted on a horizontal bar 43. As shown in FIG. 3, the bar 43 has end roller connections 44 with a pair of horizontal rails 45 whereby it can be reciprocated by lever 46.

Figure 9:
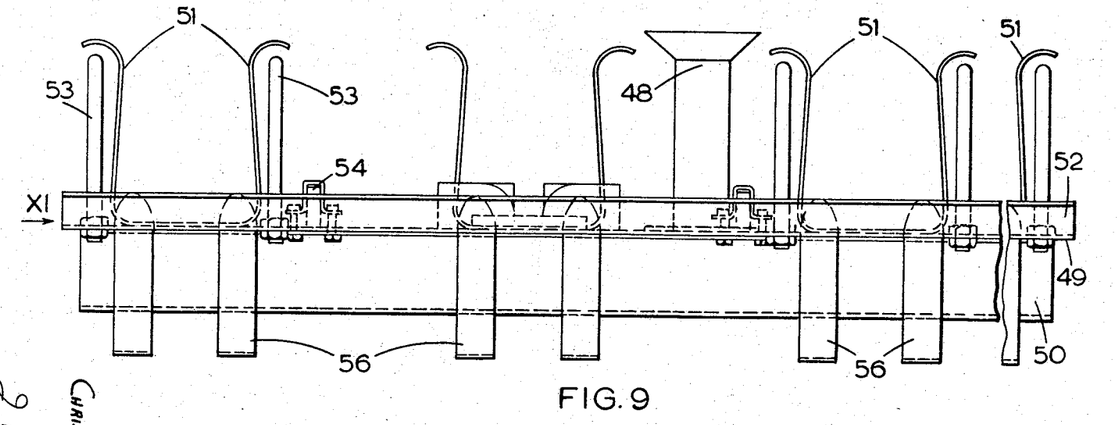
FIG. 9 is a detail side view showing a transfer loader device.
Figure 10:
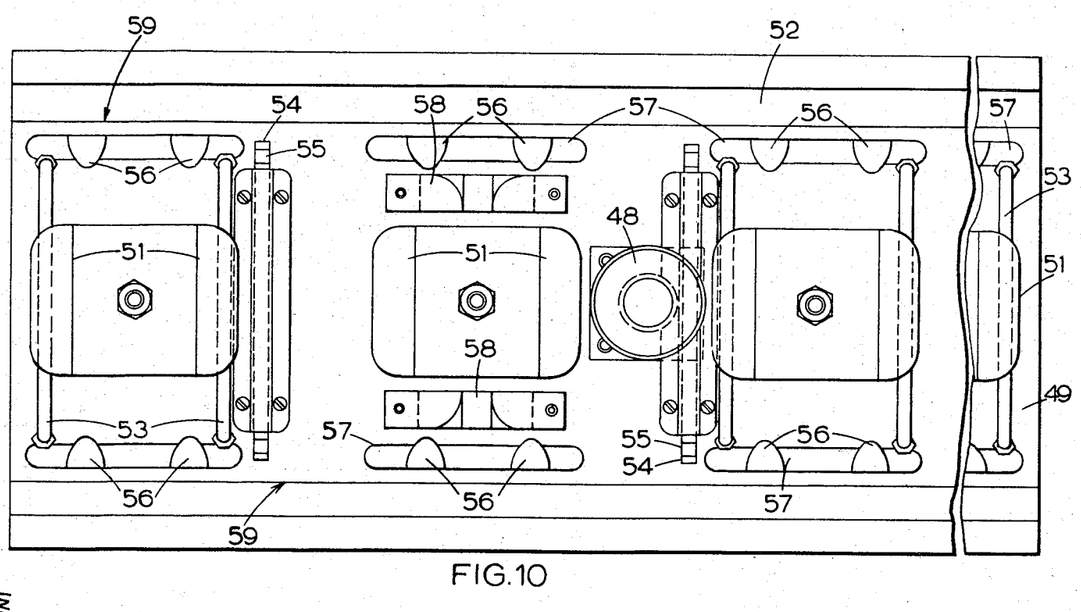
FIG. 10 is a plan view corresponding to FIG. 8.
Figure 11:
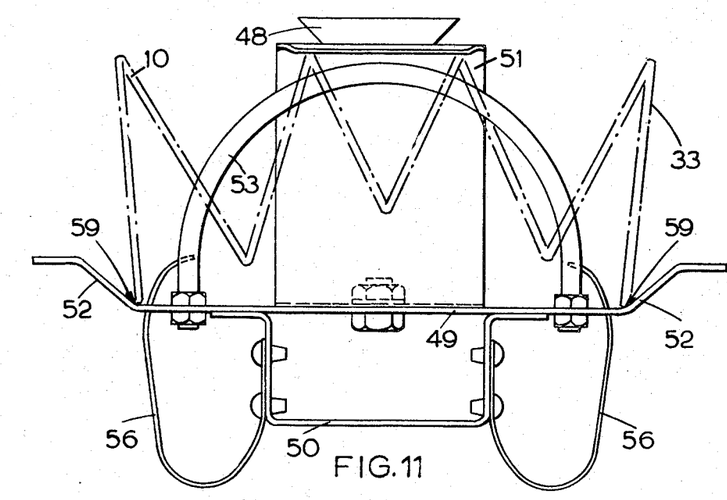
FIG. 11 is a view in the direction of arrow XI of FIG. 9.

Two spigot fingers 47 extend upwardly from the base 21 for engagement with socket tubes 48 which are mounted on the transfer loaders 16 shown in FIGS. 9 to 11.

A series of transfer loaders is provided, each comprising a base 49 of a length corresponding to that of the spring-feeding tray 17 and which is reinforced by a box spine 50. The base 49 carries a series of pairs of broad spring arms 51 arranged to receive the hour-glass springs 10 by embracing the relatively narrow mid-portions of the springs. Longer sides 52 of the base extend in an outwardly splayed manner to act as guides to facilitate spring insertion. Semi-circular guide rods 53 are arranged at the sides of alternate pairs of arms 51 to facilitate positioning of the crimp wires 11.

Magnetic blocks 54 are secured at intervals along the base 49 and these blocks are recessed at 55 to receive crimp wires 11. Spring arms 56 extend upwardly from the spine 50 to prevent spring end coils entering slots 57 until desired, as hereinafter described, and guide blocks 58 are provided to position the crimp portions 12 of the wires 11.

In use of the loaders, crimp wires 11 are arranged one along the aligned recesses 55 at each end of blocks 54 where they are held in place by magnetic attraction, and furniture springs 10 are inserted between the spring arms 51 and with their ends in engagement with roots 59 of the splayed sides 52. In this position light compression of the springs is effected at the held side of each end coil.

The loaders are then transported in succession to a position above the spring-feeding tray, which has its walls 22 splayed outwards, and are inverted and moved downwards through a first step until the springs 10 and crimp wires 11 enter the tray with the angled end coils of the springs between the walls 22 and the levers 29. The tray walls 22 are then moved inwards whereupon the springs are compressed and their end coils are gripped between the walls 22 and the serrated faces 32 of the L-shaped levers 29 which are then in spring-urged contact with the inner faces of the walls. During this movement the upper lengths of the spring end coils are carried clear of the roots 59 of the sides 52 against which they abutted and are free to pass through the aforementioned slots 57. The loader is then moved downwards through a second step whereupon the crimp wires 11 are engaged by the clips 35 and the ends 15 enter the mouths 39. The transfer loader is then retracted and returned to a loading base; during the retraction the crimp wires and springs are held by the stronger grip of the tray members and are thus removed from the loader.

In position in the trays, with the trays opening upwardly, spring knots 60 (see FIG. 1) are arranged at nine o'clock or three o'clock (looking towards the machine), and the crimp wires 11 lie inside the end coils of the springs with the crimp lips 14 extending inwardly. The pre-bent ends 15 of the crimp wires are engaged in the mouths of the spring-loaded turners 38 which are manually preset when the tray is loaded, although such presetting may be effected automatically.

It will be appreciated that it is possible to insert the springs 10 and the crimp wires 11 into the tray manually, thus dispensing with the use of the transfer loaders. To this end, a horizontal operating bar (not shown) may be provided on lever 26 for manually moving the walls 22 inwardly and outwardly. In a further alternative, a series of trays are provided to be suitably loaded and fed in turn to the machine part 18. It will be appreciated however that the transfer loader is useful where a high rate of production is to be achieved and the output of the machine is not to be limited by the one or two operators who would feed springs and crimp wires directly into the tray. Also, similar transfer loaders and spring feeding trays may be used in various alternative forms of spring assembly machines, for example, of the kind where spiral wires are employed instead of crimp wires to interconnect the end coils of the springs; in this latter case the loaders and trays would carry only springs.

Figure 13A:
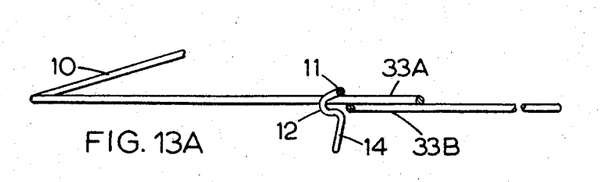
FIGS. 13A, 13B, 13C and 13D show the steps involved in applying the crimp wires.
Figure 13B:
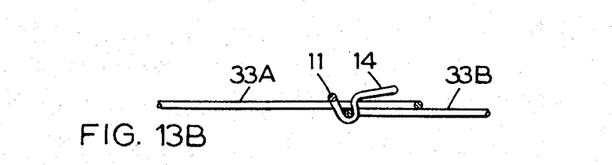

The loaded trays 17 are then turned through 90° to be open towards the spring-receiving part 18 of the machine and are moved forwards towards this part under the action of lever 46. The tray introduces the springs into the assembly mechanism with the leading lengths 33A of their end coils inside the trailing lengths 33B of the end coils of the preceding row of springs as shown in FIG. 13A. At each pair of overlapping bottom coils, the crimp portion of the crimp wire is arranged with the U opening forwardly and the lip 14 approximately vertical; the crimp wire is just rearward of the trailing coil length 33B. The wire is then rotated, by the turners 38 which are freed by an actuator in the engaging catches 41, through about one third of a revolution in the direction of arrow in FIG. 8. In the wire position reached, as shown in FIG. 13B, the U of the crimp portion has passed the vertical position with the lip 14 extending forwardly and a few degrees upwardly, and the crimp wires link the spring end coils with the end coils of the preceding row of springs; thus the length 33A is sandwiched between the length 33B and the straight lengths of the wire 11, and the length 33B sandwiched between the length 33A and the yoke of the U-shaped part of the crimp portion 12.

Figure 13C:
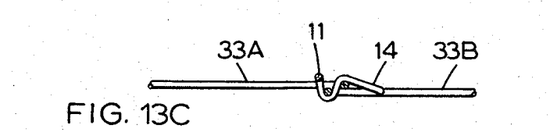

The tray is then withdrawn through a first step and the crimp wires are removed from the tray by the pull of the preceding spring lengths 33B. The crimp lips 14 pass over the tray spring lengths 33A which are then engaged by the U-shaped portions and partly removed from the tray against the restraining action of the ratchet-faced levers 29; in this position the trailing and leading lengths of the overlapping spring coils are close together as shown in FIG. 13C.

During the initial withdrawal step of the tray the preceding crimp wires are clinched as hereinafter described.

Figure 12:
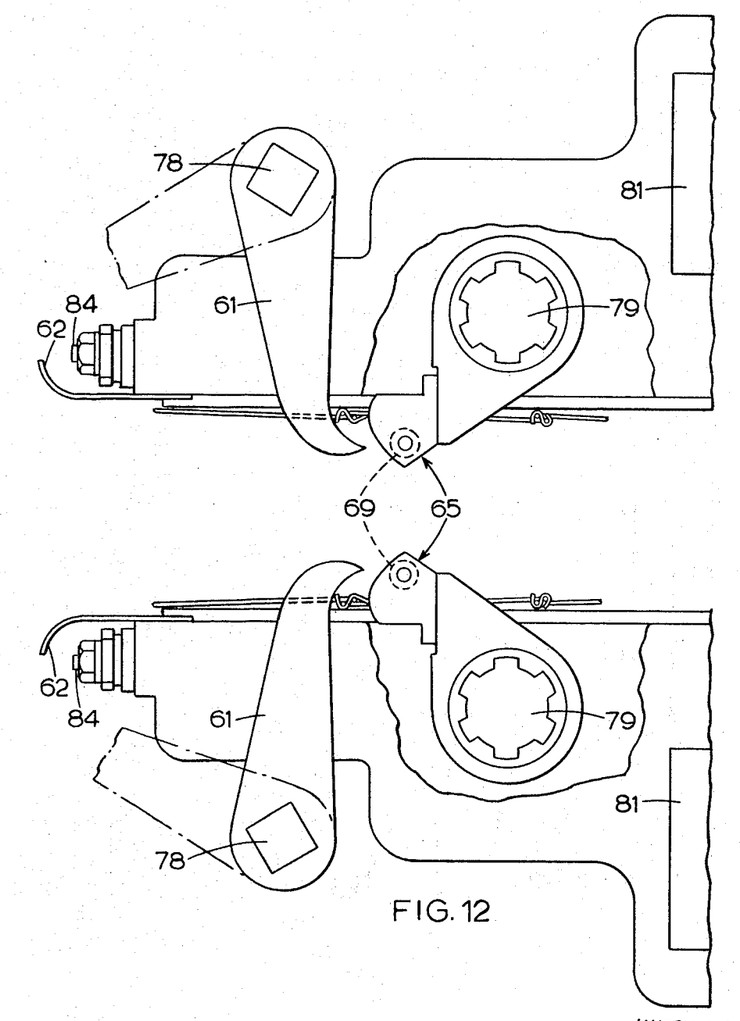
FIG. 12 is a fragmentary side elevation showing principal operative parts of the machine.

Two series of claw-like traversing arms 61 (FIG. 12) then rotate, in opposite senses, to engage the crimp wires 11 between the springs and draw the spring assembly forward whereupon the springs are fully removed from the tray which then withdraws a further step to its spring-receiving position.

Spring fingers 62 are mounted at the upper and lower working surfaces of the spring-receiving station to limit the expansion of the springs on removal from the tray.

To promote satisfactory movement of the partly finished spring assembly through the machine, at least two pawl-like fingers (not shown) may be provided at the rear of the machine to operate simultaneously with the traversing arms 61 and draw the assembly through the machine.

The spring assembly moves forwards till the last-introduced row of overlapping coil lengths 33A, 33B rides up and over a series of anvil ramps 63 to be accurately sandwiched between anvils 64 and a series of complementary rotary hammers 65. The hammers 65 have already moved a short distance inwardly to guide the crimp portions in an inward direction. In this position (FIG. 13C), the crimp wire has turned through a small angle so that the lips 14 extend a few degrees downwardly; the axis of the U has just passed vertical and it is important to note that the angle between said axis and the lip is more than 90°.

Figure 13D:
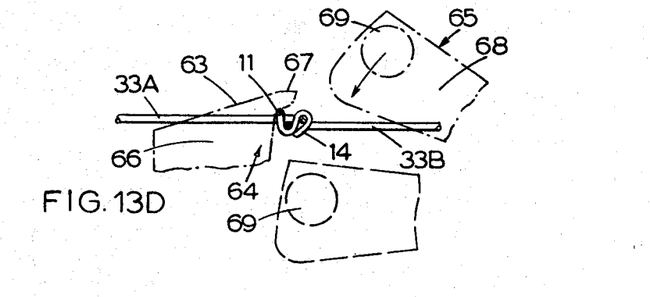
Figure 14:
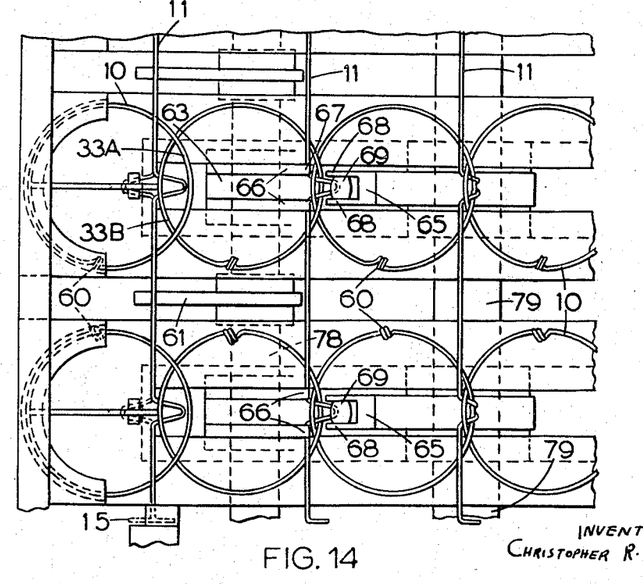
FIG. 14 is a fragmentary plan view corresponding generally to FIG. 12 and showing the bottom end coils of the springs.

Each anvil unit comprises a pair of walls 66 formed with a pair of forwardly-pointing teeth 67 which hold the coil overlaps in position. Each corresponding hammer 65 also comprises a pair of walls 68 between which a roller 69 is mounted. The upper and lower hammers rotate, in opposite senses, the lower hammers moving so that their rollers 69 exert a downward and rearward pressure on the adjacent wire lips 14 to effect crimping as shown in FIG. 13D. During the crimping operation, the anvil teeth 67 prevent the overlapping coils from rising and the spaced walls 68 of the (lower) hammer, which are of curved form, press the crimp wires into position under the anvil teeth and also slide under the resilient leading coil length 33A to give support against downward buckling. After crimping, the hammers 65 pass below the working surfaces to permit free progression of the crimped overlaps.

After crimping, the ends of the crimp wires are cropped by adjustable cutters of the mechanism 20 which may be operated by hydraulic pressure derived from a pump 70 driven by electric motor 71 which is the prime-mover of the machine.

The motor 71 drives a split shaft 72 which carries cams 73, 74, 75 and 76; cam 73 operates the reciprocating lever 46 which is mounted on shaft 77, cam 74 operates the traversing arms 61 which are mounted on shafts 78, cams 75 operate the hammers 65 which are mounted on shafts 79, and cam 76 drives the hydraulic pump 70.

In operation, the machine is set up by appropriately positioning hammer and anvil units or heads 80 which are carried by rectangular-section bars 81 and are fixed in position by eccentrically mounted shafts 82 which clamp the units onto the bars by compressing rubber pads 83 on the unit castings. The units may be arranged to be moved laterally by an end-controlled series of lazy-tongs to give uniformity of spacing when the overall size is altered. The anvils are pivotally mounted and may be adjusted for position and height, by means of a screw arrangement 84, to accommodate a range of spring and wire diameters.

A spring-receiving tray or more than one end-to-end tray of the required length is then selected and mounted in position. At the start of an operation to produce a spring assembly, the first row of springs is inserted into the tray 17 with the end coils held between the aforementioned hook portions on the base of the tray. Alternatively this row of springs may be manually inserted into the machine.

The first crimp wire is of special form with the crimp portions being of simple U-shape in elevation, and this wire is applied manually. In position in the tray, the end coils of the springs 10 are appreciably angled so that on insertion into the machine the crimp wires are positioned outwardly of the planes of the tray walls and are thus engaged by the traversing arms 61; it will be appreciated that the end coils (33A) of the subsequent spring rows are held by the L-shaped levers 29 but they are also held outwardly by their engagement with the preceding row of springs and they are thus engaged by the traversing arms 61.

Subsequent rows of springs 10 and crimp wires 11 are then fed to the machine till the required length of spring assembly has been produced.

In some forms of upholstery, for example vehicle seats, it is only desired to have crimp wires on the coils at the top or bottom ends of the springs and the machine described above may be modified to produce spring assemblies for such upholstery, by removing the upper hammer and anvil units.

One advantage realised by the invention resides in the simple application of the crimp wires which requires only one simple turning movement and does not involve complex angling of the end coils of the springs. A further advantage is that a number of operators may fill transfer loaders to be fed to the tray and thus the capacity of the machine is not limited by the delays involved in manually loading the trays or loading the machine directly. The transfer loaders and the tray hold the springs under a degree of compression and this allows springs to be used even if their actual size varies from the prescribed dimension.

I claim:

1. A machine for producing assemblies of helical furniture springs arranged in parallel rows and having their end coils interconnected by crimp wires which extend parallel to the rows, the machine being arranged to receive successive rows of springs and at least one crimp wire which extends along the spring row and comprises a generally straight wire formed at the spring positions with crimp portions each of which comprises a loop shaped in elevation as a U having a lip extending from the end of the free limb of the U, and the machine comprising receiving means to receive successive rows of springs and crimp wires with the leading lengths of the end coils of the entering row of springs overlapping the trailing lengths of the end coils of the springs of the preceding row and with the crimp wires generally aligned with said trailing lengths, means for rotating the crimp wires through a part revolution to pass said lips through between the overlapping lengths of adjacent springs which are then located by each trailing length being sandwished between the yoke of the U and the leading length which is itself sandwiched between the trailing length and straight lengths of the crimp wire, means for effecting relative movement between the entering and preceding rows of springs to move the entering row of springs rearwardly relative to said preceding row of springs to bring the leading ends of the end coils of the entering springs into contact with said crimp portions, and clinching means for bending said lips round said leading lengths to lock the springs in position.

2. A machine according to claim 1, in which said clinching means comprise anvils and rotary hammers and driving means for said hammers which move the hammers outside the path of travel of the assembly as the assembly moves.

3. A machine according to claim 2, in which there are provided ramp faces over which the overlapping coil lengths and the crimp portions ride before reaching said anvils.

4. A machine according to claim 3, in which teeth project from the ends of said ramp faces to limit any rise of the overlapping coil lengths and the crimp portions from the anvil.

5. A machine according to claim 2, in which said hammers each comprises a roller to engage the lip of the crimp portion and mounted between a pair of walls formed with curved faces which pass close to said leading length and support said leading length against deformation due to pressure exerted by the bending lip.

6. A machine according to claim 2, in which said anvils and hammers are incorporated in heads which are mounted on parallel bars and are adjustable in position along said bars.

7. A machine according to claim 1, in which a cropping mechanism is mounted at a delivery side of the machine to sever the ends of the crimp wires.

8. A machine according to claim 1, in which traversing arms are provided to engage the straight portions of the successive crimp wires to move the assembly through the machine in a series of steps.

9. A machine according to claim 1, and comprising a tray in which each of the rows of springs and crimp wires is fed to said receiving means.

10. A machine according to claim 9, in which the spring-feeding tray comprises a pair of walls between which a row of helical furniture springs is accommodated, said walls being movable away from each other to facilitate insertion of the springs and being movable towards each other to effect gripping of the end coils of the inserted springs and so hold the inserted springs in position.

11. A machine according to claim 10, in which spring clips are provided on said tray to hold a crimp wire at the outer ends of a tray wall.

12. A machine according to claim 10, in which said tray walls are hingedly mounted on a base and spring-loaded levers are urged towards said walls to sandwich said end coils of the springs between the walls and the levers, and ratchet faces are provided on the levers to promote gripping of the end coils.

13. A machine according to claim 9, in which spring-loaded turners are mounted on said tray to rotate the crimp wire, and means are provided to cock said turners.

14. A machine according to claim 9, in which a transfer loader accommodates at least part of a row of springs, said loader comprising gripping means to hold the springs releasably, and abutments to engage the end coils of the springs.

15. A machine according to claim 14, in which guide faces lead to said abutments to facilitate manual insertion of the springs into the loader.

16. A machine according to claim 14, in which magnetic members are provided in the loader for holding at least one crimp wire which extends along the spring row.

17. A machine according to claim 9, in which spring fingers are provided at said receiving means for holding the trailing lengths of the end coils of the springs against excessive expansion.

18. A machine according to claim 1, and comprising two lengths of a split-shaft which received a central drive from a prime mover, cams mounted on said shaft lengths, and driving connections between said cams and working parts of the machine.

19. A method of producing assemblies of helical furniture springs arranged in parallel rows and having their end coils interconnected by crimp wires which extend parallel to the rows and which each comprise a generally straight wire formed at the spring positions with crimp portions, the method comprising feeding successive rows of springs and at least one crimp wire which extends along the spring row and whose crimp portions each comprises a loop shaped in elevation as a U having a lip extending from the end of the free limb of the U, to receive said rows of springs and crimp wires with the leading lengths of the end coils of the entering row of springs overlapping the trailing lengths of the end coils of the springs of the preceding row, rotating the crimp wires through a part revolution when generally aligned with said trailing lengths to pass said lips through between the overlapping lengths of the adjacent springs which are then located by each trailing length being sandwiched between the yoke of the U and the adjacent leading length which is itself sandwiched between the trailing length and straight lengths of the crimp wire, effecting relative movement between the entering and preceding rows of springs to move the entering row of springs rearwardly relative to said preceding row of springs to bring said leading ends of the end coils of the entering springs into contact with said crimp portions, and clinching said crimp portions by bending said lip round said leading lengths to lock the springs in position.

20. A method according to claim 19, in which each of the rows of springs and crimp wires is fed to the receiving means in a tray.

21. A method according to claim 20, and comprising the step of inserting a row of springs and at least one crimp wire into a transfer loader, and loading said tray by transferring the springs and crimp wire from the loader to the tray.

22. A crimp wire for assemblies of furniture springs, comprising a generally straight length and a series of similar crimp portions spaced along said length in accordance with the spring positions in the formed assembly, each crimp portion comprising a loop shaped in elevation as a U having a generally straight lip extending forwardly from the end of the free limb of the U and angled downwardly at approximately 20°.

23. A crimp wire according to claim 22, in which at least one end of the wire is pre-bent at right angles to the straight length of the wire to facilitate turning of the wire.

References Cited

UNITED STATES PATENTS 3,288,176  11/1966  Davis ---------------- 140—3

FOREIGN PATENTS 920,741  3/1963  Great Britain.

RICHARD J. HERBST, *Primary Examiner.*

L. A. LARSON, *Assistant Examiner.*